(12) United States Patent
Peng et al.

(10) Patent No.: US 8,345,447 B2
(45) Date of Patent: Jan. 1, 2013

(54) MOUNTING APPARATUS FOR EXPANSION CARDS

(75) Inventors: Wen-Tang Peng, Taipei Hsien (TW); Guang-Yi Zhang, Shenzhen (CN); Zhe Zhang, Shenzhen (CN)

(73) Assignees: Hong Fu Jin Precision Inudstry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 326 days.

(21) Appl. No.: 12/894,165

(22) Filed: Sep. 30, 2010

(65) Prior Publication Data

US 2012/0033388 A1 Feb. 9, 2012

(30) Foreign Application Priority Data

Aug. 4, 2010 (CN) .......................... 2010 1 0245056

(51) Int. Cl.
*H05K 7/02* (2006.01)

(52) U.S. Cl. ....................................................... 361/810
(58) Field of Classification Search .................. 361/726, 361/732, 747, 679.4, 759, 801, 810
See application file for complete search history.

*Primary Examiner* — Jeremy Norris
*Assistant Examiner* — Tremesha S Willis
(74) *Attorney, Agent, or Firm* — Altis Law Group, Inc.

(57) ABSTRACT

An assembly includes a circuit board, a support perpendicular to the circuit board, and a mounting apparatus including a sliding bracket to accommodate an expansion card, a driving member pivotably mounted to the second support, and a clamping arm mounted to the sliding bracket. The sliding bracket is slidably mounted to the second support, and the driving member is fixed to the sliding bracket. The clamping arm is operable to press or release the expansion card. When the driving member is moved in a first direction, the sliding bracket is moved towards the circuit board, and the expansion card is moved to connect to the circuit board. When the driving member is moved in a second direction opposite to the first direction, the sliding bracket is moved away from the circuit board, and the expansion card disengages from the circuit board.

20 Claims, 5 Drawing Sheets

MOUNTING APPARATUS FOR EXPANSION CARDS

BACKGROUND

1. Technical Field

The disclosure relates to mounting apparatuses for expansion cards, and particularly relates to a mounting apparatus that readily secures a number of expansion cards in a computer enclosure and allows convenient removal of the expansion cards from the computer enclosure.

2. Description of Related Art

In order to upgrade the operating capabilities of a personal computer, expansion cards are commonly installed in the enclosure of the computer. Typical types of expansion cards include network cards, sound cards, graphics accelerator cards, multi-media cards etc. These expansion cards may be installed in the computer enclosure during manufacture or by the computer user.

Usually, the mounting apparatus for expansion cards includes a pressing element and a screw to secure a separate cover plate of each expansion card. However, installing screws one by one is time-consuming and cumbersome. Moreover, during installation or removal of the expansion cards, one or more of the screws can easily fall into the crowded interior of the computer and be difficult to retrieve.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
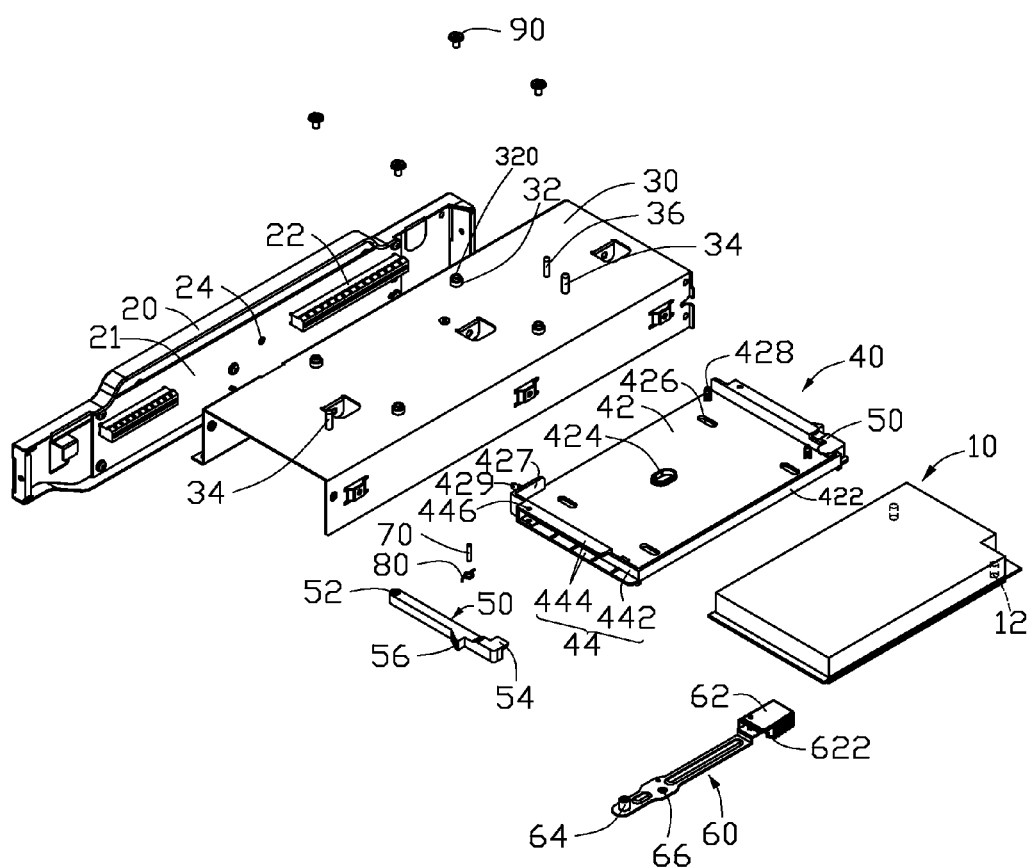
FIG. 1 is an exploded, isometric view of an embodiment of a mounting apparatus for expansion cards, together with an expansion card.
Figure 2:
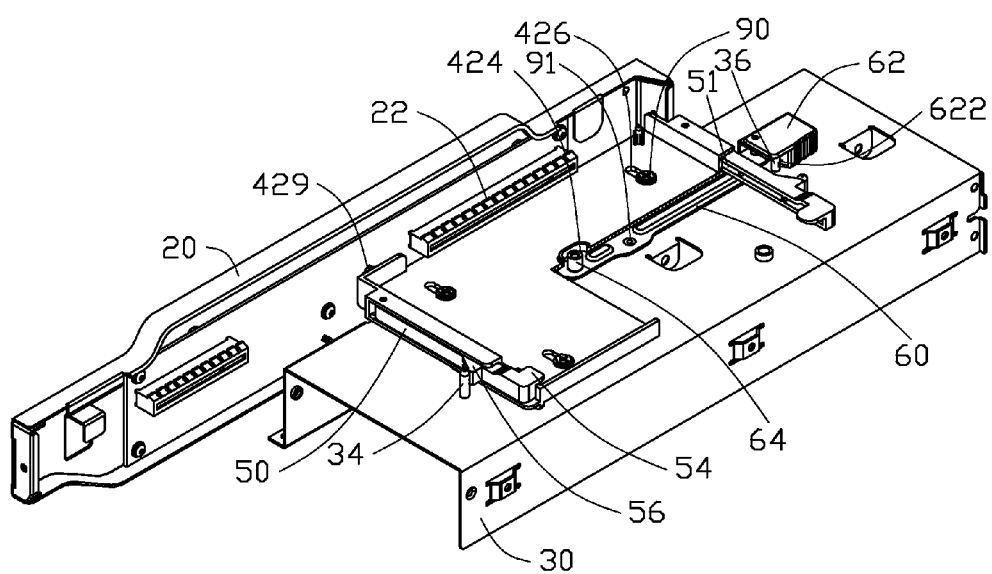
FIG. 2 an assembled, isometric, partly cutaway view of FIG. 1.

Referring to FIGS. 1 and 2, a mounting apparatus is provided to readily secure an expansion card 10 in a computer enclosure, or conveniently remove the expansion card 10 from the computer enclosure.

The expansion card 10 defines two fixing holes 12 in a bottom of the expansion card 10. A port (not shown) is formed on a side of the expansion card 10.

The computer enclosure includes a first support 20 and a second support 30. A circuit board 21 defining a mounting hole 24 is mounted to a front side surface of the first support 20 perpendicular to a top surface the second support 30. A connector 22, corresponding to the port of the expansion card 10 extends forward from the circuit board 21. Four guiding posts 32, each axially defining a fixing hole 320, protrude from the top surface of the second support 30. Two resisting posts 34 protrude from the top surface of the second support 30, beside the guiding posts 32, respectively adjacent to opposite ends of the second support 30. A latching post 36 protrudes from the top surface of the second support 30, located at a rear side of one of the resisting posts 34.

In a first embodiment, the mounting apparatus includes a sliding bracket 40, two clamping arms 50 pivotably mounted to opposite ends of the sliding bracket 40, a driving member 60, two pins 70, two torsion springs 80, and a number of bolts 90. In FIG. 1, one of the pins 70 and one of the torsion springs 80 are mounted in the one of the clamping arms 50.

The sliding bracket 40 includes a base board 42, and two holding portions 44 protruding from opposite ends of the base board 42. A flange 422 extends from a front side of the base board 42, connected between the holding portions 44. The base board 42 defines a through hole 424 in the center of the base board 42, and four oblong shaped adjusting holes 426 at four corners of the base board 42. Two positioning protrusions 428 protrude from a first end of the base board 42, adjacent to one of the holding portions 44. In this embodiment, a number of protrusions (not shown) protrude from the base board 42, adjacent to the other holding portion 44, for supporting the bottom of the expansion card 10. A resisting board 427 extends from a rear side of the base board 42, opposite to the flange 422. One end of the resisting board 427 is connected to the holding portion 44 at the second end of the base board 42, and an opposite end of the resisting board 427 is spaced from the other holding portion 44 at the first end of the base board 42. A tenon 429 extends from the resisting board 427, away from the flange 422.

Each holding portion 44 includes a sidewall 442 perpendicularly extending from a corresponding end of the base board 42, and two clamping walls 444 extending from opposite sides of the sidewall 442, both parallel to the base board 42. Each sidewall 442 is connected to the flange 422 of the base board 42, and each clamping wall 444 located above the base board 42 is spaced from the flange 422. Each clamping wall 444 defines a mounting hole 446 adjacent to the rear side of the base board 42.

Each clamping arm 50 defines a through hole 52 in a first end of the clamping arm 50. A first side of the clamping arm 50 defines a receiving slot 51 (shown in FIG. 2), communicating with the through hole 52. A tab 54 perpendicularly extends from the first side of the clamping arm 50, at a second end of the clamping arm 50 opposite to the first end of the clamping arm 50. A wedge-shaped resisting block 56 protrudes from a second side of the clamping arm 50, opposite to the receiving slot 51, and is located between the through hole 52 and the tab 54.

An engaging stub 64 protrudes from a first end of the driving member 60, and an operating portion 62 protrudes from a second end of the driving member 60, opposite to the engaging stub 64. A hook 622 extends from the bottom of the operating portion 62. The driving member 60 defines a pivot hole 66 therein between the engaging stub 64 and the operating portion 62. The distance between the engaging stub 64 and the pivot hole 66 is less than that the distance between the pivot hole 66 and the operating portion 62.

To mount the mounting apparatus to the computer enclosure, each torsion spring 80 is received in the receiving slot 51 of the corresponding clamping arm 50, and then, the clamping arms 50 are received in the holding portions 44, correspondingly. The pin 70 is extended through the mounting hole 446 of one of the clamping walls 444 above the base board 42, the through hole 52 of each clamping arm 50, and each torsion spring 80 in that order, and engages in the mounting hole 446 of the other clamping wall 444, thereby the clamping arms 50 are pivotably mounted to the holding portions 44, correspondingly. In this state, a first foot of each torsion spring 80 resists against the sidewall 442 of the corresponding holding portion 44, and a second foot of the torsion spring 80 resists against a sidewall bounding the corresponding receiving slot 51. One shaft 91 is extended through the pivot hole 66 of the driving member 60, and is engaged in the second support 30. Thereby, the driving member 60 is pivotably mounted to the second support 30. The driving member 60 can be rotated around the shaft 91, and the hook 662 of the driving member 60 can be latched to the latching post 36 of the second support 30. The sliding bracket 40 together with the clamping arms 50 is slidably located on the top surface of the second support 30. The guiding posts 32 of the second support 30 are slidably engaged in the corresponding adjusting holes 426 of the sliding bracket 40. The bolts 90 are engaged in the fixing holes 320 of the corresponding guiding posts 32, each bolt 90 including a large head abutting against the sliding bracket 40. The engaging stub 64 of the driving member 60 is engaged in the through hole 424 of the sliding bracket 40. The tenon 429 of the sliding bracket 40 is in alignment with the mounting hole 24 of the circuit board 21.

Figure 3:
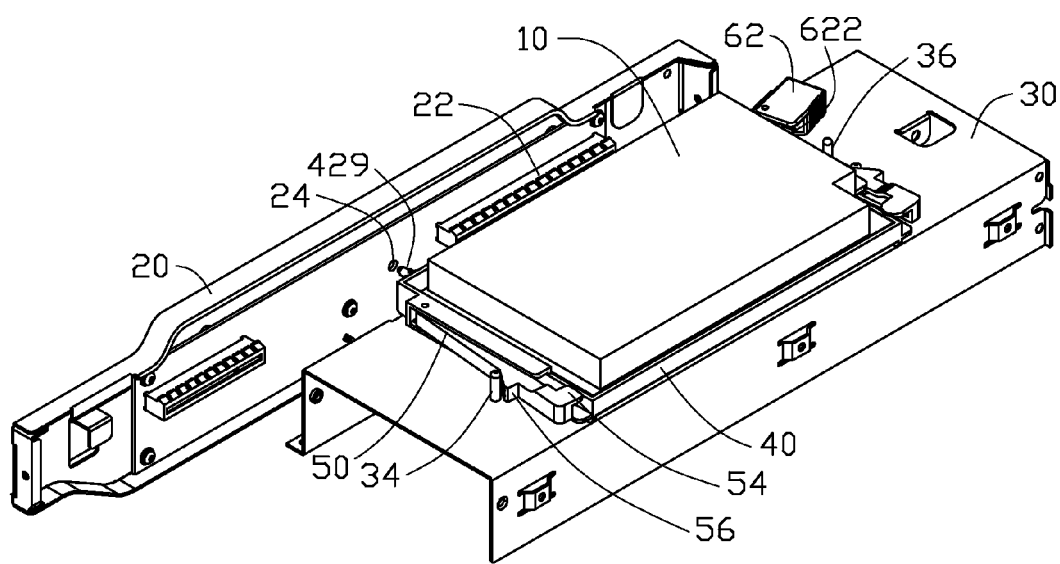
FIGS. 3 and 4 are operational state views of mounting the expansion card to the mounting apparatus of FIG. 1.
Figure 4:
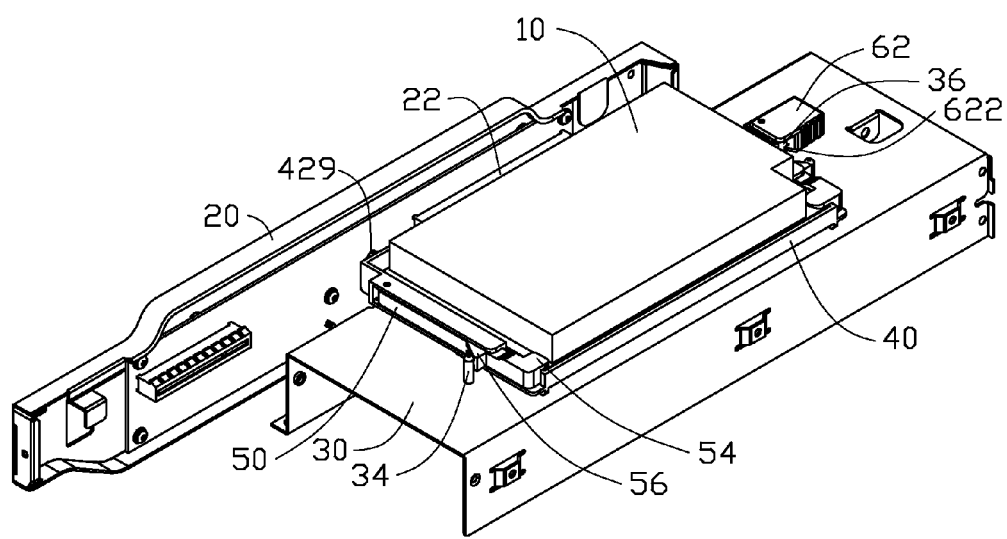

Referring to FIGS. 3 and 4, in assembly of the expansion card 10, the expansion card 10 is positioned on the base board 42 of the sliding bracket 40, with the positioning protrusions 428 of the sliding bracket 40 engaged in the corresponding fixing holes 12 of the expansion card 10. Therefore, the expansion card 10 is mounted to the sliding bracket 40.

When the operating portion 62 of the driving member 60 is rotated to move away from the circuit board 21, the engaging stub 64 of the driving member 60 together with the sliding bracket 40 rotates towards the circuit board 21 around the shaft 91. In this process, the resisting posts 34 of the second support 30 urge the corresponding resisting blocks 56 to move the clamping arms 50 to clamp the sliding bracket 40, and the torsion springs 80 are deformed. The tenon 429 is inserted into the mounting hole 24 of the circuit board 21. When the port of the expansion card 10 is completely connected to the connector 22 of the circuit board 21, the hook 622 of the driving member 60 is latched by the latching post 36. The tab 54 of each clamping arm 50 presses the top surface of the expansion card 10, to prevent the expansion card 10 from moving up. Therefore, the expansion card 10 is mounted to the computer enclosure without the use of screws and a screwdriver.

In removal of the expansion card 10 from the computer enclosure, the hook 622 of the driving member 60 is disengaged from the latching post 36, and then the operating portion 62 is rotated to move towards the circuit board 21. Therefore, the engaging stub 64 of the driving member 60 together with the sliding bracket 40 rotates away from the circuit board 21 around the shaft 91. The tenon 429 is disengaged from the mounting hole 24 of the circuit board 21, and the port of the expansion card 10 is disengaged from the connector 22 of the circuit board 21. The resisting blocks 56 of the clamping arms 50 move away from the corresponding resisting posts 34. Therefore, the torsion springs 80 restore to move the clamping arms 50 with the tabs 54 away from the sliding bracket 40. Therefore, the expansion card 10 can be readily removed from the sliding bracket 40 without the use of screws and a screwdriver.

Figure 5:
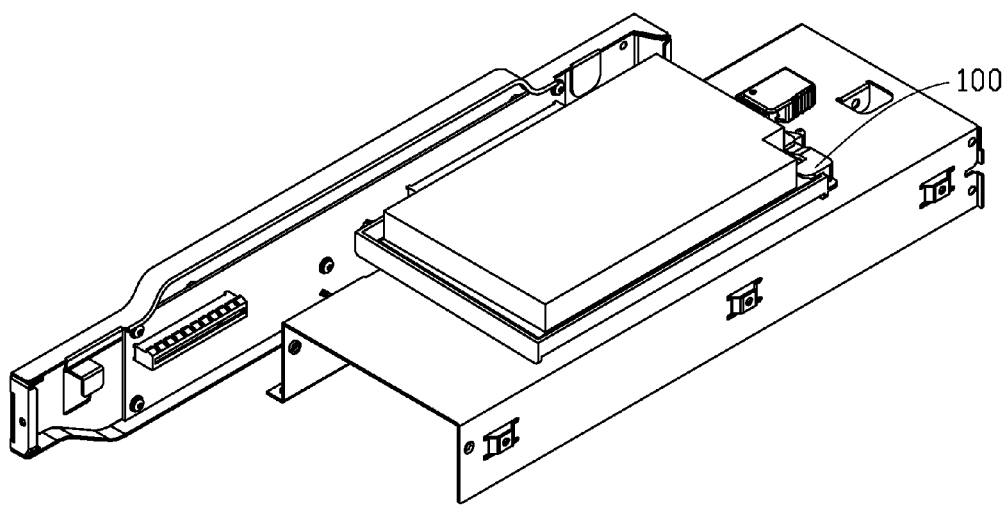
FIG. 5 is an assembled, isometric view of another embodiment of a mounting apparatus for expansion cards, together with an expansion card.

Referring to FIG. 5, in a second embodiment, a mounting apparatus include one clamping arm 100 having a wedge-shaped resisting block, and one resisting post (not labeled) urging the resisting block of the clamping arm 100.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus provided to mount an expansion card to a circuit board, the circuit board mounted to a first support, and perpendicular to a second support, a latching post protruding from the second support, the mounting apparatus comprising:
   a sliding bracket configured to mount the expansion card, the sliding bracket slidably mounted to the second support;
   a driving member pivotably mounted to the second support, a first end of the driving member latched to the sliding bracket, and a second end opposite to the first end of the driving member comprising a hook; and
   a clamping arm pivotably mounted to the sliding bracket;
   wherein when the second end of the driving member is rotated to move away from the circuit board, the first end of the driving member together with the sliding bracket is rotated towards the circuit board, the clamping arm is rotated to sandwich the expansion card between the sliding bracket and the clamping arm, and wherein when the hook is latched with the latching post, the expansion card is connected to the circuit board;
   wherein when the hook is disengaged from the latching post, and the second end of the driving member is moved towards the circuit board, the first end of the driving member together with the sliding bracket is rotated away from the circuit board, the clamping arm is rotated to move away from the sliding bracket to release the expansion card.

2. The mounting apparatus of claim 1, wherein the sliding bracket defines a through hole, an engaging stub protrudes from the first end of the driving member, and engages in the through hole.

3. The mounting apparatus of claim 2, wherein an operating portion protrudes from the second end of the driving member, the hook extends from the bottom of the operating portion, the driving member defines a pivot hole between the engaging stub and the operating portion, a shaft is extended through the pivot hole and fixed to the second support.

4. The mounting apparatus of claim 3, wherein the sliding bracket comprises a holding portion pivotably mounting the clamping arm, a wedge-shaped resisting block and a tab correspondingly extend from opposite sides of the clamping arm, the tab is capable of pressing the expansion card toward the sliding bracket, a resisting post extends from the second support, to resist against and move the resisting block towards the sliding bracket.

5. The mounting apparatus of claim 4, wherein the holding portion comprises a sidewall and two clamping walls extending from opposite sides of the sidewall, each clamping wall defines a mounting hole, the clamping arm defines a through hole, away from the tab, a pin is extended through the mounting hole of one of the clamping walls, the through hole of the clamping arm, and engaged in the mounting hole of the other clamping wall, thereby pivotably mounting the clamping arm to the holding portion.

6. The mounting apparatus of claim 5, wherein the clamping arm defines a receiving slot opposite to the resisting block to receive a torsion spring, the torsion spring is sleeved on the pin, a first foot of the torsion spring resists against the sidewall of the holding portion, and a second foot of the torsion spring resists against an inner sidewall bounding the receiving slot.

7. The mounting apparatus of claim 3, wherein a plurality of guiding posts each axially defining a fixing hole protrude from the second support, the sliding bracket defines a plurality of oblong shaped adjusting holes, the guiding posts are slidably engaged in the corresponding adjusting holes, a plurality of bolts are engaged in the fixing holes of the corresponding guiding posts.

8. The mounting apparatus of claim 1, wherein the sliding bracket comprises a holding portion receiving the clamping arm, a wedge-shaped resisting block and a tab correspondingly extend from opposite sides of the clamping arm, the tab is capable of pressing the expansion card toward the sliding bracket, a resisting post extends from the second support, to resist against and move the resisting block towards the sliding bracket.

9. The mounting apparatus of claim 8, wherein the holding portion comprises a sidewall and two clamping walls extending from opposite sides of the sidewall, each clamping wall defines a mounting hole, the clamping arm defines a through hole, away from the tab, a pin is extended through the mounting hole of one of the clamping walls, the through hole of the clamping arm, and engaged in the mounting hole of the other clamping wall, thereby pivotably mounting the clamping arm to the holding portion.

10. The mounting apparatus of claim 9, wherein the clamping arm defines a receiving slot opposite to the resisting block to receive a torsion spring, the torsion spring is sleeved on the pin, a first foot of the torsion spring resists against the sidewall of the holding portion, and a second foot of the torsion spring resists against an inner sidewall bounding the corresponding receiving slot.

11. The mounting apparatus of claim 9, wherein the driving member is mounted to the second support by a shaft, the first and second ends of the driving member is capable of rotating around the shaft, an engaging stub protrudes from the first end of the driving member and is mounted to the sliding bracket, an operating portion protrudes from the second end of the driving member, the hook extends from the bottom of the operating portion.

12. The mounting apparatus of claim 1, wherein a connector extends from the circuit board to connect to the expansion card, a tenon extends from the sliding bracket, wherein when the sliding bracket moves towards or away from the circuit board, the tenon is engaged with or disengaged from the circuit board.

13. An assembly provided to mount an expansion card, the assembly comprising:
   a circuit board;
   a support perpendicular to the circuit board; and
   a mounting apparatus comprising:
      a sliding bracket configured to accommodate the expansion card, the sliding bracket slidably mounted to the support;
      a driving member pivotably mounted to the support, and a first end of the driving member fixed to the sliding bracket; and
      a clamping arm pivotably mounted to the sliding bracket;
   wherein when the driving member is moved in a first direction, the sliding bracket is moved towards the circuit board, with the expansion card being moved to connect to the circuit board, the clamping arm is rotated to press the expansion card to the sliding bracket, wherein when the driving member is moved in a second direction opposite to the first direction, the sliding bracket is moved away from the circuit board, with the expansion card being disengaged from the circuit board, the clamping arm is rotated to move away from the sliding bracket to release the expansion card.

14. The assembly of claim 13, wherein a latching post protrudes from the support, a second end opposite to the first end of the driving member comprises a hook capable of latching the latching post.

15. The assembly of claim 14, wherein the sliding bracket defines a through hole, an engaging stub protrudes from the first end of the driving member, and engages in the through hole.

16. The assembly of claim 15, wherein an operating portion protrudes from the second end of the driving member, the hook extends from the bottom of the operating portion, the driving member defines a pivot hole, a shaft is extended through the pivot hole and fixed to the support, the first and second ends of the driving member are capable of rotating around the shaft.

17. The assembly of claim 16, wherein the sliding bracket comprises a holding portion pivotably mounting the clamping arm, a wedge-shaped resisting block and a tab correspondingly extend from opposite sides of the clamping arm, the tab is capable of pressing the expansion card toward the sliding bracket, a resisting post extends from the support, to resist against and move the resisting block towards the sliding bracket.

18. The assembly of claim 17, wherein the holding portion comprises a sidewall and two clamping walls extending from opposite sides of the sidewall, each clamping wall defines a mounting hole, the clamping arm defines a through hole, away from the tab, a pin is extended through the mounting hole of one of the clamping walls, the through hole of the clamping arm, and engaged in the mounting hole of the other clamping wall, thereby to mount the clamping arm to the holding portion.

19. The assembly of claim 18, wherein the clamping arm defines a receiving slot opposite to the resisting block to receive a torsion spring, the torsion spring is sleeved on the pin, a first foot of the torsion spring resists against the sidewall of the holding portion, and a second foot of the torsion spring resists against an inner sidewall bounding the corresponding receiving slot.

20. The assembly of claim 16, wherein a plurality of guiding posts each axially defining a fixing hole protrude from the support, the sliding bracket defines a plurality of oblong shaped adjusting holes, the guiding posts are slidably engaged in the corresponding adjusting hole, a plurality of bolts are engaged in the fixing holes of the corresponding guiding posts.

* * * * *

UNITED STATES PATENT AND TRADEMARK OFFICE
CERTIFICATE OF CORRECTION

| | | Page 1 of 1 |
|---|---|---|
| PATENT NO. | : 8,345,447 B2 | |
| APPLICATION NO. | : 12/894165 | |
| DATED | : January 1, 2013 | |
| INVENTOR(S) | : Peng et al. | |

It is certified that error appears in the above-identified patent and that said Letters Patent is hereby corrected as shown below:

On the Title Page, Item [73] should read:

(73) Assignees: Hong Fu Jing Precision Industry (ShenZhen) Co., Ltd., Shenzhen, (CN); Hon Hai Precision Industry Co., Ltd., New Taipei (TW).

Signed and Sealed this
Eighth Day of April, 2014

Michelle K. Lee
*Deputy Director of the United States Patent and Trademark Office*